United States Patent [19]

Ohara

[11] Patent Number: 5,175,615
[45] Date of Patent: Dec. 29, 1992

[54] WHITE BALANCE PROCESSING DEVICE

[75] Inventor: Eiji Ohara, Kanagawa, Japan

[73] Assignee: Canon Kabushiki Kaisha, Tokyo, Japan

[21] Appl. No.: 859,612

[22] Filed: Mar. 23, 1992

Related U.S. Application Data

[63] Continuation of Ser. No. 513,571, Apr. 23, 1990, abandoned.

[30] Foreign Application Priority Data

Apr. 27, 1989 [JP] Japan .................................. 1-111013

[51] Int. Cl.⁵ .............................................. H04N 9/73
[52] U.S. Cl. ....................................... 358/29; 358/29; 358/170; 358/174
[58] Field of Search ............... 358/29 C, 27, 170, 174, 358/29

[56]   References Cited
U.S. PATENT DOCUMENTS 4,247,868  1/1981  Onodera ........................... 358/29 C
4,679,065  7/1987  Umezawa ............................. 358/29
4,734,762  3/1988  Aoki ................................... 358/29 C
4,745,461  5/1988  Shirai ................................. 358/27
4,860,092  8/1989  Hieda ................................. 358/29 C
4,942,458  7/1990  Miyajima ........................... 358/29 C

FOREIGN PATENT DOCUMENTS 142693  8/1983  Japan ................................. 358/29 C Primary Examiner—Tommy P. Chin
Attorney, Agent, or Firm—Robin, Blecker, Daley & Driscoll

[57]   ABSTRACT

A white balance processing device comprises an amplifier which permits selection of one of a plurality of discrete amplification degrees; and an A-D converter the conversion gain which is variable by changing a reference voltage value. The selection of the amplification degree of the amplifier and the setting of the reference voltage value of the A-D converter are arranged to be performed in association with each other for continuous white balance control.

13 Claims, 5 Drawing Sheets

WHITE BALANCE PROCESSING DEVICE

This is a continuation application under 37 CFR 1.62 of prior application Ser. No. 513,571, filed Apr. 23, 1990 now abandoned.

BACKGROUND OF THE INVENTION

1. Field of the Invention

This invention relates to a white balance processing device which is advantageously adapted for a solid-state camera or the like.

2. Description of the Related Art

Heretofore, the device of the above-stated kind has been arranged as shown in FIG. 5 of the accompanying drawings. Referring to FIG. 5, correlative double sampling (abbreviated to CDS) circuits 21 are provided for removing noises such as 1/f and reset noises that are included in a video signal output from an area sensor or the like. Voltage changeable amplifier (abbreviated to VCA) circuits 22 and 24 are arranged to have their amplification degree variable by changing their voltage values. An amplifier circuit 23 is arranged to have its amplification degree unvarying. Clamp circuits 25 are arranged to perform a clamping process on the video signal. Analog-to-digital (abbreviated to A-D) converters 26 are arranged to convert an analog video signal into a digital video signal. A white balance control circuit 27 is arranged to generate a control voltage for changing the amplification degrees of the VCA circuits 22 and 24 for white balance control.

The white balance control is performed in the following manner: R (red), G (green) and B (blue) video signals which have been processed by the CDS circuits 21 are supplied to the amplifier circuits 22, 23 and 24 respectively. The G video signal is amplified to a given amplification degree and output from the amplifier circuit 23. Meanwhile, the R and B video signals are amplified by the VCA circuits 22 and 24 to amplification degrees which are controlled by the control signals RWB and BWB output from the white balance control circuit 27 in such a way as to be at a level equal to the output level of the G video signal in respect of a white object. In other words, the white balance control is performed to cause the R, G and B video signals output from the amplifier circuits 22, 23 and 24 to be at the same level for a white object.

However, since the conventional device has been arranged to control the white balance by using the voltage changeable amplifiers as described above, the variable range of their amplification degrees is relatively narrow. Besides, a waveform distortion results from deterioration of phase and frequency characteristics.

SUMMARY OF THE INVENTION

It is, therefore, an object of this invention to provide a white balance processing device which has a wide dynamic range.

In accordance with this invention, the white balance processing device comprises amplifiers each of which is arranged to permit selection of an amplification degree from among a plurality of discrete amplification degrees; and analog-to-digital (abbreviated to A-D) converters each of which is arranged to have its conversion gain variable by changing a reference voltage value. The selection of the amplification degree and the setting of the reference voltage value are arranged to be performed in association with each other. This enables the white balance processing device to accurately carry out white balance control over a wide dynamic range without causing any waveform distortion.

The above and further object and features of this invention will become apparent from the following detailed description of embodiment thereof taken in connection with the accompanying drawings.

DETAILED DESCRIPTION OF THE PREFERRED EMBODIMENT

Figure 1:
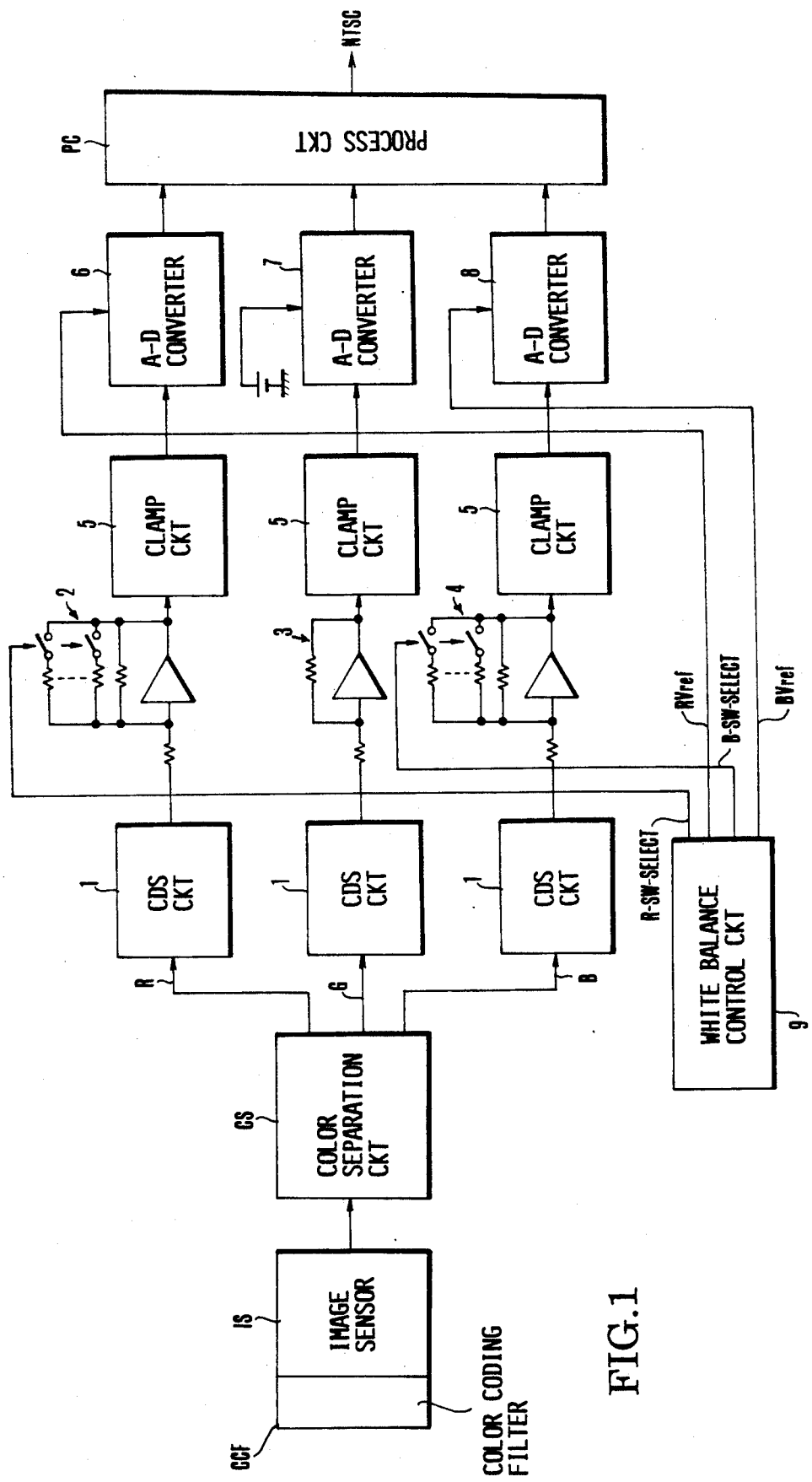
FIG. 1 is a block diagram showing the circuit arrangement of an embodiment of this invention.

FIG. 1 shows an embodiment of this invention. In FIG. 1, a reference symbol CCF denotes a color coding filter (color separation filter). A symbol IS denotes an image sensor. A symbol CS denotes a color separation circuit. The illustration includes correlative double sampling circuits 1; amplifiers 2 and 4 each of which is arranged to permit selection of one of a plurality of discrete amplification degrees; an amplifier 3 which has a constant amplification degree; clamp circuits 5 which are arranged to perform a clamping process on the video signals; A-D converters 6 and 8 which are arranged to have their conversion gains variable by adjusting reference voltages used for them; and an A-D converter 7 which has a fixed conversion gain. A white balance control circuit 9 is arranged to select the amplification degrees of the amplifiers 2 and 4 and to set the conversion gains of the A-D converters 6 and 8 by controlling the reference voltages for white balance adjustment. A process circuit PC is arranged to form a standard TV signal conforming, for example, to the NTSC system by performing various correcting and converting processes on the signals supplied to the process circuit.

The embodiment operates as follows: The R, G and B video signals which have been processed by the CDS circuits 1 are supplied to the amplifiers 2, 3 and 4 which are wide-band amplifiers such as a Norton amplifier. The G video signal is amplified to a given fixed degree. Meanwhile, the R and B video signals are amplified to designated degrees of amplification according to selection signals R-SW-SELECT and B-SW-SELECT which are output from the white balance control circuit 9. Each of these designated amplification degrees is selected from among a plurality of discretely variable amplification degrees by changing the feedback resistance values of the amplifiers 2 and 4 from one value over to another.

Figure 2:
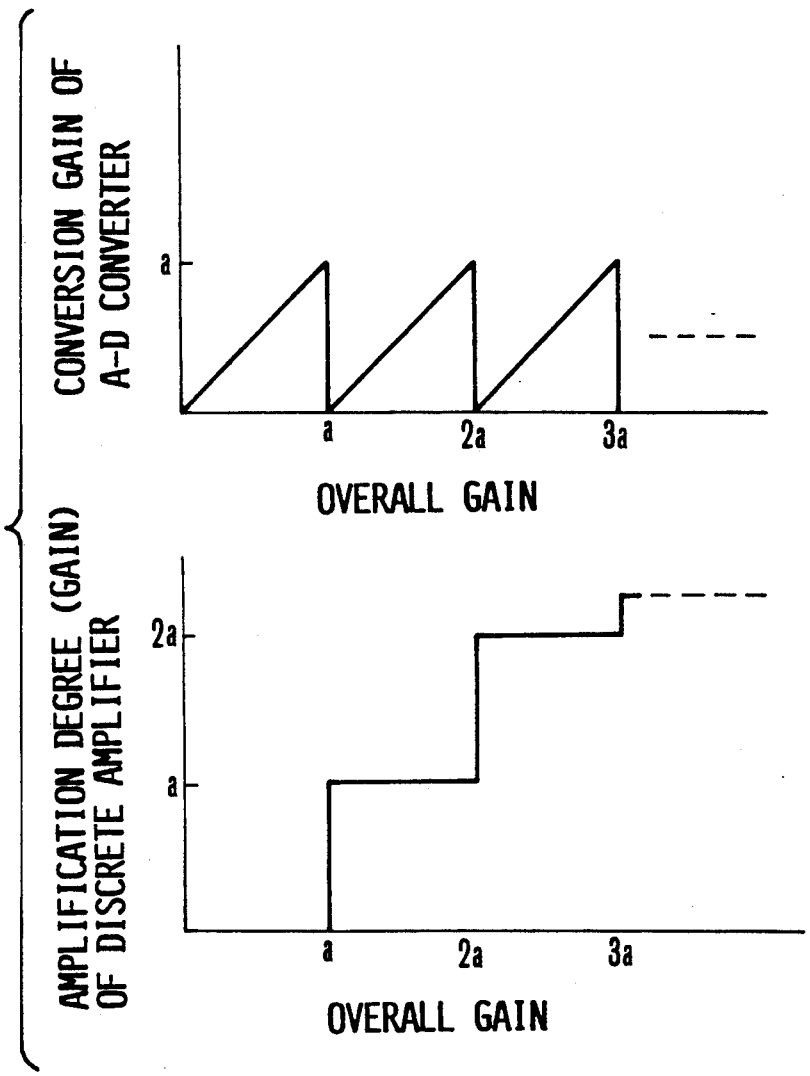
FIG. 2 shows gain variations resulting from white balance control.

The R, G and B video signals output from the amplifiers 2, 3 and 4 are supplied to the clamp circuits 5 to be set at input ranges designated for the A-D converters 6, 7 and 8. The A-D converters 6, 7 and 8 convert these analog signals into digital signals. The conversion gains of the A-D converters 6 and 8 are arranged to be variable by changing the reference voltages. It is an advantage that the waveform distortion can be lessened by this arrangement. The conversion gains increase when the reference voltages are lowered. The white balance control circuit 9 produces control voltages RVref and BVref as the reference voltages. The R and B video signals are thus A-D converted at the designated conversion gains respectively. Meanwhile, the A-D converter 7 is arranged to have a fixed reference voltage and to A-D convert the G video signal at a fixed conversion gain. The above-stated control arrangement is such that, after the A-D conversion, the levels of the R, G and B video signals are equal to each other in the form of digital video signals. Further, as regards the control signals output from the white balance control circuit 9, the signal R-SW-SELECT is in association with the reference signal RVref, and the signal B-SW-SELECT is in association with the reference signal BVref. This relation is described below through gain variations with reference to FIG. 2:

FIG. 2 shows the gains of the amplifier 2 or 4 and the A-D converter 6 or 8 which are controlled by the white balance control signals in relation to overall gains respectively. As shown, the conversion gain of the A-D converter 6 or 8 varies repeatedly within a range of variations "a". The amplification degree of the amplifier 2 or 4 is changed from one degree over to another at every repeating point of the varying range "a" of the conversion gain of the A-D converter 6 or 8. In other words, the amplification degree is changed stepwise at every end of the repeating range "a".

In order to maintain the relation depicted, the control signals R-SW-SELECT and B-SW-SELECT and reference signals RVref and BVref are generated in such a way as to have the overall gains continuous.

Generally, S/N ratio deterioration and errors would take place in the digital signal output if the reference voltage is lowered too much for the purpose of broadening the variable range "a" of the conversion gain of the A-D converter 6 or 8. The reference voltage, therefore, cannot be lowered to a great degree. However, the amplification degree of the amplifier 2 or 4 is variable within a wide range and up to a high degree by using the above-stated Norton amplifier or the like and by arranging the feedback resistance value to be changeable from one value over to another. With the A-D converter and the amplifier arranged in combination in the case of this embodiment, therefore, the overall gain is variable for white balance adjustment within a very wide range.

Figure 3:
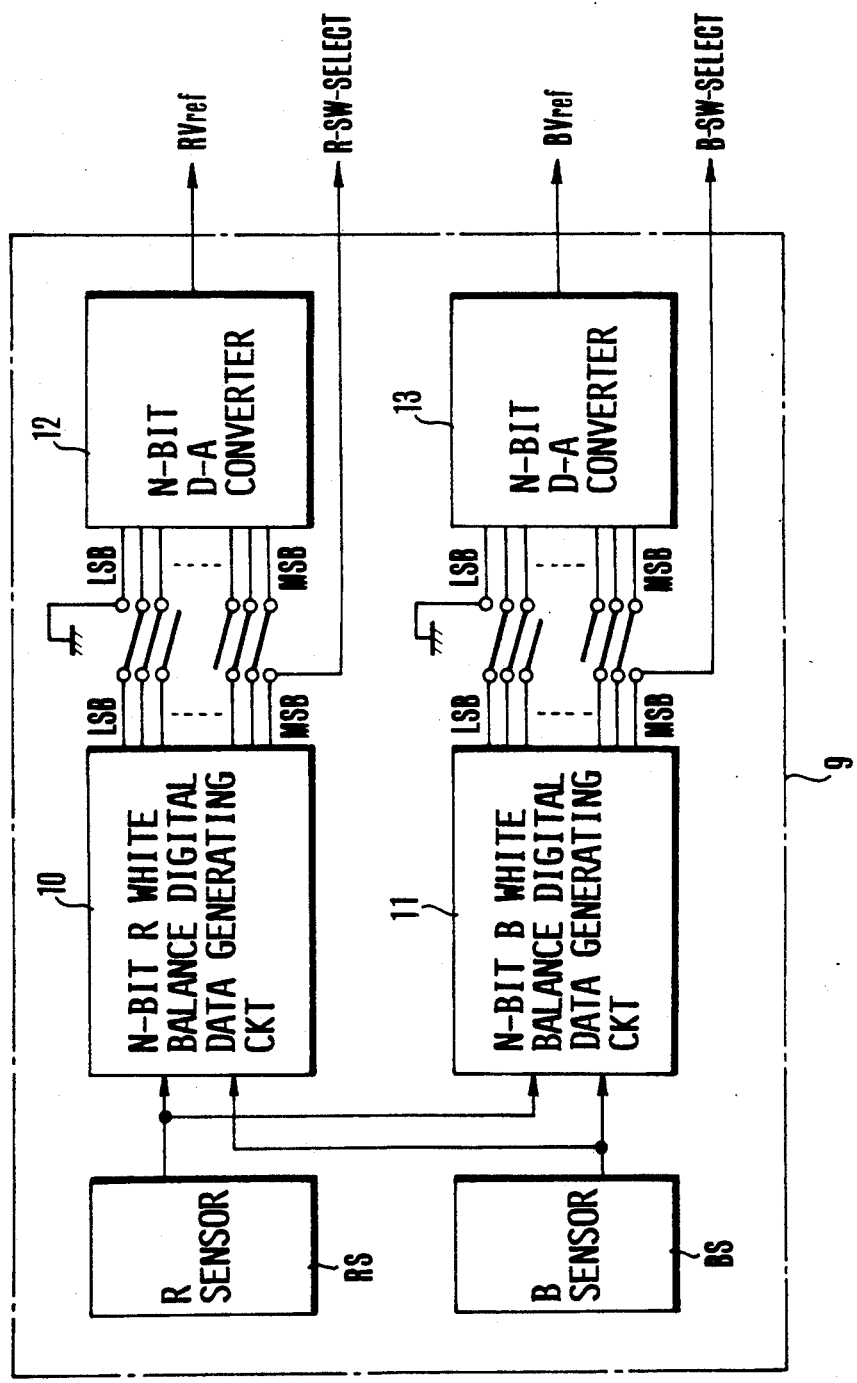
FIG. 3 shows, by way of example, the details of a white balance control circuit arranged according to this invention.
Figure 4:
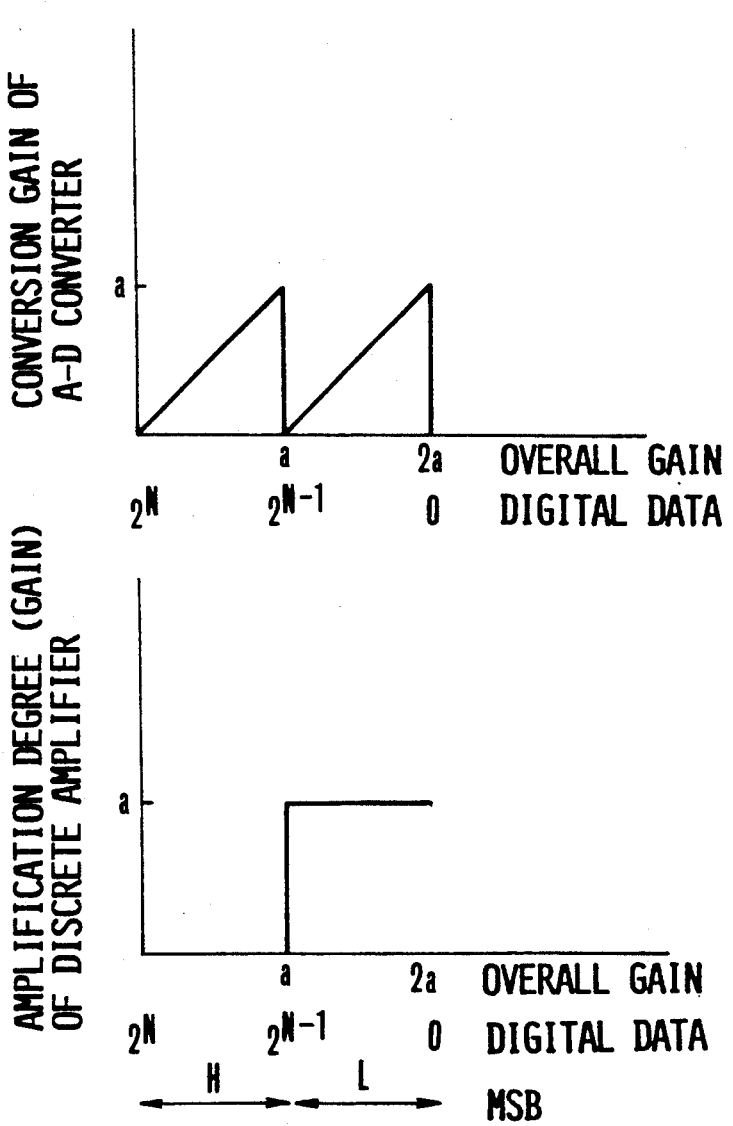
FIG. 4 shows gain variations resulting from the white balance control performed by the circuit of FIG. 3.
Figure 5:
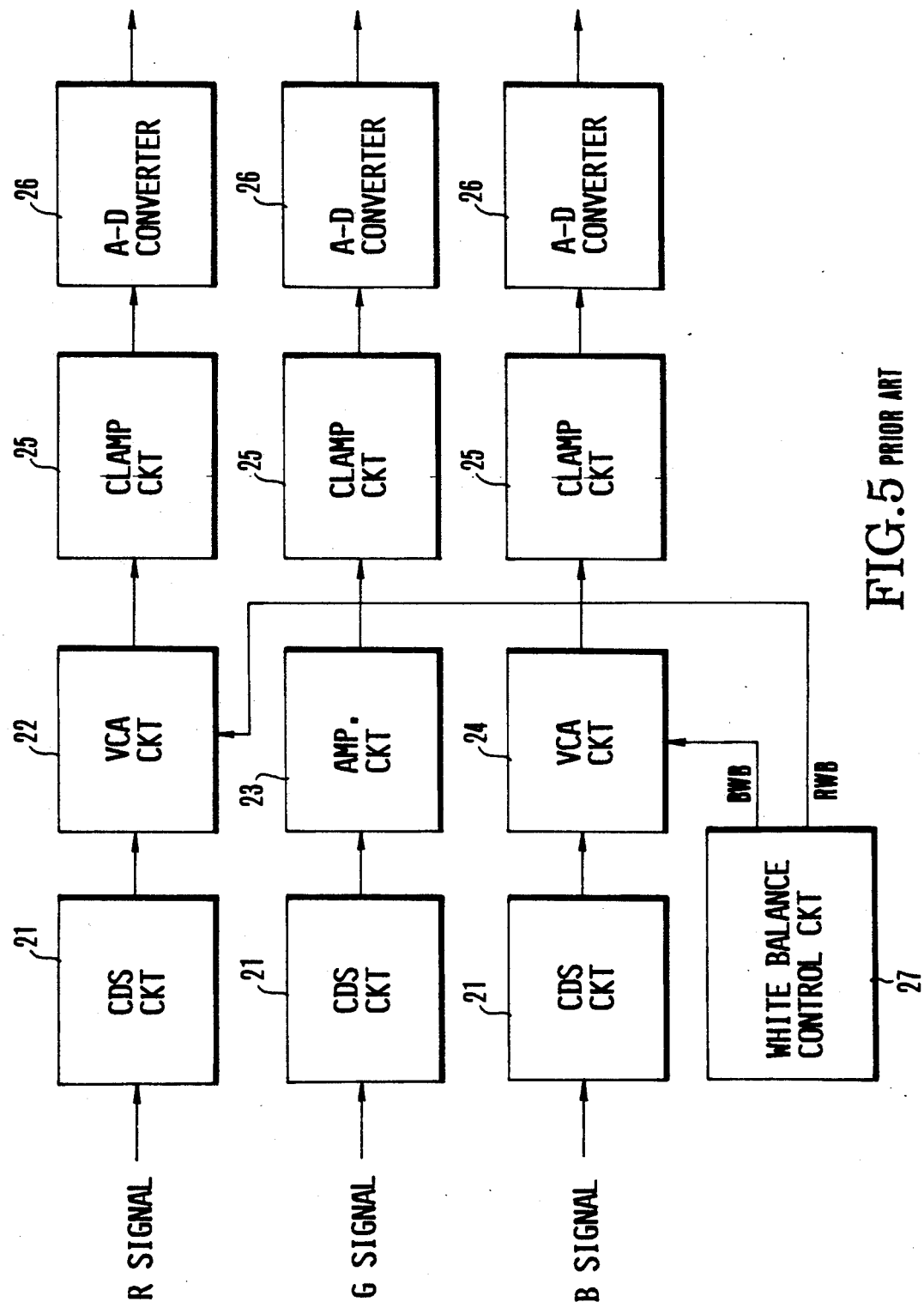
FIG. 5 is a block diagram showing the conventional circuit arrangement.

The details of the white balance control circuit 9 of this embodiment are described as follows: FIG. 3 shows, by way of example, the arrangement of the white balance control circuit 9. The illustration includes a red sensor RS; a blue sensor BS; and digital data generating circuits 10 and 11 which are arranged to generate white balance digital data of N bits for the colors R (red) and B (blue) respectively. The changes of the LSBs (least significant bits) of the data correspond to the changes of gains obtained by dividing the variable ranges of the above-stated overall gains by $2^N$. N bit D-A (digital-to-analog) converters 12 and 13 are arranged to convert the digital data into voltage values. The circuit 10 is connected to the converter 12, and the circuit 11 is connected to the converter 13, with their output data shifted by one bit as shown in FIG. 3 respectively. The MSBs (most significant bits) of the outputs of the circuits 10 and 11 are produced as the control signals R-SW-SELECT and B-SW-SELECT. As shown in FIG. 4, the reference signals RVref and BVref are obtained by generating voltage level signals repeatedly at the boundaries between intermediate gains within the variable range of the overall gains of the A-D converters. Therefore, the variations of the conversion gains of the A-D converters can be repeatedly controlled. Further, since the level of the MSB changes at the changing point of the conversion gain, the amplification degree of each of the amplifiers can be controlled by changing the amplification degree from one value over to another according to changes in the binary levels of the MSB. Further, it is, of course, possible to change the bit shifting connection between the circuit 10 and the converter 11 and between the circuit 11 and the converter 13 to be effected by shifting the output data to a greater degree, i.e., by two or three bits instead of one.

As described in the foregoing, the embodiment is capable of continuously accomplishing white balance control over a wide variable range without causing any waveform distortion.

In accordance with the invention, the amplifiers are arranged to accurately operate as their amplification degree is changed from one value over to another by changing a resistance ratio. Further, since the conversion gain changes of the A-D converters are arranged to be in inverse proportion to the reference voltages, the reference voltages can be used without lowering them too much. Therefore, the conversion gains can be finely controlled with the reference voltages arranged to be variable to a great degree within the variable range of the conversion gains.

The arrangement described in the foregoing enables the embodiment to accurately carry out white balance control despite its simplicity.

What is claimed is:

1. A white balance processing device comprising:
    a) a plurality of amplifiers for a plurality of color components, each of which is arranged to permit selection of an amplification degree thereof from among a plurality of discrete amplification degrees;
    b) a plurality of analog-to-digital converters respectively coupled to the plurality of amplifiers for the plurality of color components, each said analog-to-digital converter arranged to have a conversion gain thereof variable by adjusting a reference voltage value; and
    c) control means for continuously performing white balance adjustment by associating the selections of the amplification degree of said plurality of amplifiers and the adjusting of the reference voltage value for said plurality of analog-to-digital converters with each other.

2. A device according to claim 1, wherein each of said amplifiers is arranged to have a plurality of feedback resistance values.

3. A device according to claim 2, wherein said control means is arranged to select one of said plurality of feedback resistance values for each of said amplifiers.

4. A device according to claim 1, further comprising a color signal source arranged to supply said plurality of color components to said amplifiers.

5. A device according to claim 4, wherein said color signal source includes a color image sensor.

6. A device according to claim 5, wherein said color image sensor includes a combination of image sensing means and a color separation filter.

7. A color image sensing device comprising:

a) color image sensing means;
b) control means for controlling white balance of a plurality of color components output from said color image sensing means, said control means including:
b-1) first gain control means for discretely controlling gains of the plurality of color components according to first control signals, said first gain control means including amplifiers and resistance means for feeding outputs of said amplifiers back to inputs of said amplifiers;
b-2) second gain control means for continuously controlling gains of the plurality of color components according to second control signals; and
b-3) a signal source for supplying said first and second control signals in a cooperative manner.

8. A device according to claim 7, wherein said first control signals are arranged to discretely change a resistance value of said resistance means.

9. A color image sensing device comprising:
a) color image sensing means;
b) control means for controlling white balance of a plurality of color components output from said color image sensing means, said control means including:
b-1) first gain control means for discretely controlling gains of the plurality of color components according to first control signals;
b-2) second gain control means for continuously controlling gains of the plurality of color components according to second control signals, said second gain control means including analog-to-digital converters; and
b-3) a signal source for supplying said first and second control signals in a cooperative manner.

10. A device according to claim 9, wherein said color image sensing means includes at least one image sensor.

11. A device according to claim 10, wherein said color image sensing means includes at least one color separation filter.

12. A device according to claim 9, wherein said second control signals are arranged to change a reference voltage of said analog-to-digital converters.

13. A device according to claim 9, wherein said signal source is arranged to supply said first and second control signals in such a manner that changes in an overall gain caused by said first and second gain control means continuously takes place.

* * * * *